(12) United States Patent
Lee et al.

(10) Patent No.: US 11,343,318 B2
(45) Date of Patent: May 24, 2022

(54) CONFIGURABLE INTERNET OF THINGS COMMUNICATIONS SYSTEM

(71) Applicant: Amazon Technologies, Inc., Seattle, WA (US)

(72) Inventors: Alexandra Elizabeth Baoboe Lee, Seattle, WA (US); Nicholas A. Gochenaur, Seattle, WA (US); Christoph Saalfeld, Seattle, WA (US); Himanshu Jindal, Seattle, WA (US); Eeshan Shreeram Thakar, Seattle, WA (US); Jared Sharfin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 96 days.

(21) Appl. No.: 16/712,896

(22) Filed: Dec. 12, 2019

(65) Prior Publication Data

US 2021/0160325 A1 May 27, 2021

Related U.S. Application Data

(60) Provisional application No. 62/939,641, filed on Nov. 24, 2019.

(51) Int. Cl.
*H04L 29/08* (2006.01)
*G06F 9/54* (2006.01)
(Continued)

(52) U.S. Cl.
CPC ............ *H04L 67/125* (2013.01); *G06F 9/547* (2013.01); *H04L 63/166* (2013.01)

(58) Field of Classification Search
CPC .... H04N 21/64; H04N 21/22; H04L 12/1845; H04L 12/1859; H04L 12/1877;
(Continued)

(56) References Cited

U.S. PATENT DOCUMENTS

| 7,620,821 B1 * | 11/2009 | Grohoski | ............. G06F 9/3851 380/1 |
| 10,616,314 B1 * | 4/2020 | Plenderleith | ............ H04L 43/08 |

(Continued)

FOREIGN PATENT DOCUMENTS

EP 3496357 A1 6/2019

OTHER PUBLICATIONS

International Search Report dated Mar. 3, 2021;International Application No. PCT/US2020/061971, filed Nov. 24, 2020; 16 pages.

*Primary Examiner* — Christopher B Robinson
(74) *Attorney, Agent, or Firm* — Knobbe, Martens, Olson & Bear, LLP

(57) ABSTRACT

Systems and methods are provided for dynamically configuring an IoT communications system. The IoT communications system receives a client message from an IoT device. The client message includes an endpoint designation (such as by specifying an endpoint in the Server Name Indication (SNI) field of the TLS client hello message). The IoT communications system determines whether the endpoint is associated with a custom or default processing logic and/or settings. Either custom or default processing logic is executed or custom or default settings are applied.

20 Claims, 7 Drawing Sheets

(51) Int. Cl.
*H04L 29/06* (2006.01)
*H04L 67/125* (2022.01)

(58) Field of Classification Search
CPC . H04L 12/1881; H04L 43/028; H04L 65/605; H04L 63/166; H04L 67/125; G06F 9/547
See application file for complete search history.

(56) References Cited

U.S. PATENT DOCUMENTS

| | | |
|---|---|---|
| 2017/0163444 A1 | 6/2017 | McLaughlin et al. |
| 2017/0187831 A1* | 6/2017 | Otting ................. H04L 41/0886 |
| 2017/0223054 A1* | 8/2017 | Wing .................... H04L 63/166 |
| 2018/0341502 A1* | 11/2018 | Rabasa ............... G06F 9/44526 |
| 2019/0014151 A1* | 1/2019 | Firke .................... H04L 63/101 |
| 2019/0238662 A1* | 8/2019 | Guibene ............... H04L 69/324 |

* cited by examiner

CONFIGURABLE INTERNET OF THINGS COMMUNICATIONS SYSTEM

INCORPORATION BY REFERENCE TO ANY PRIORITY APPLICATIONS

This application claims benefit of U.S. Provisional Patent Application Ser. No. 62/939,641 entitled "CONFIGURABLE INTERNET OF THINGS COMMUNICATIONS SYSTEM" filed Nov. 24, 2019, which is hereby incorporated by reference in its entirety.

BACKGROUND

The Internet of Things (IoT) generally refers to a system of network-connected devices, such as sensors, actuators, embedded devices, or smart appliances. For example, computing devices can be embedded in everyday objects that enable the objects to send and receive data. IoT devices can vary widely in either hardware and/or software. IoT devices may have long shelf-lives and may include non-upgradable software that are several versions or years behind current software standards or protocols, which may not be backwards compatible. Example protocols that IoT devices can use are cryptographic security protocols that are designed to provide communications security over a computer network, such as Transport Layer Security (TLS) or Secure Socket Layers (SSL).

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1:
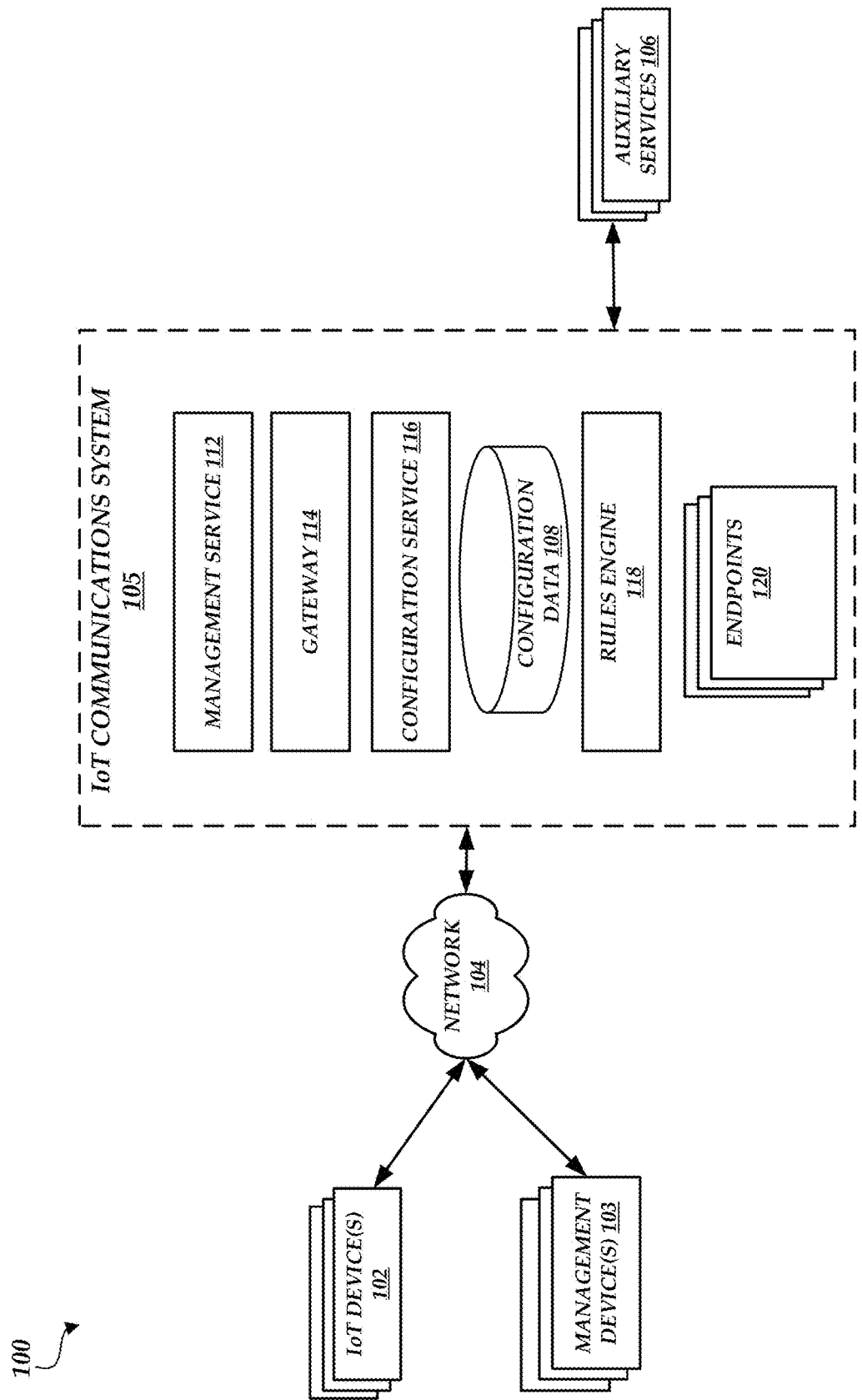
FIG. 1 is a block diagram depicting an illustrative network environment for implementing an IoT communications system.

Aspects of the present disclosure relate to a system that enables communications between Internet of Things (IoT) devices and services in a "serverless" or "cloud computing" environment. The terms "serverless" or "cloud computing" environment, as used herein, refer to environments in which responsibility for managing generation, configuration, and state of an underlying execution environment is abstracted away from a user. For example, the user need not create the execution environment, install an operating system, or manage a state of the environment in order to execute desired code in the environment.

An existing system can communicate with IoT devices from various clients. As described herein, IoT devices can be of a variety of different device types and can vary widely in either hardware and/or software. Unlike typical computers, smartphones, and/or applications on such devices (such as web browsers) that generally converge on using a set or sets of standard software and/or protocols, IoT devices can use a wide range of software and/or protocols that span many different versions or types, some of which may be outdated. To add to the complexity of the issue, the software on the IoT devices may be fairly static in that the software on the IoT devices may not be easily updatable or may not be updatable at all and/or the IoT devices may have a lifespan for five or ten years (such as consumer products). For example, an IoT device can sit in a warehouse and may not be powered on until it is purchased by a consumer and turned on. Thus, a client and/or the IoT system may not be able to update the IoT device until the device is purchased and is powered up. In other cases, an IoT device may only be powered on once a month (such as a lawn mower). Thus, it can be advantageous for the IoT system to be configurable to work with a wide variety of IoT devices and/or to have the capability to be backwards compatible with the software and/or protocols used by the IoT devices.

With reference to some specific examples, a first client, such as a household appliance manufacturer, develops and sells a smart air conditioner. The client would like their smart air conditioner to communicate with an existing IoT system. Firmware on the smart air conditioner uses a Transport Layer Security (TLS) extension, such as maximum fragment length extension or a record size limit extension. A cryptographic security protocol, such as TLS, may have a default fragmentation or record size, such as 16 kB. Thus, a device implementing the default cryptographic security protocol may be required to allocate a 16 kB input buffer and a 16 kB output buffer. For many computing devices or applications like smartphones or browsers, this requirement is not an issue. However, for some IoT devices that may have a limited amount of memory, such as 128 kB total, the default record or fragmentation size can be too high. Thus, the cryptographic security protocol extension may allow a negotiation between a client and a server of a customized fragmentation or record size, such as 512 bytes, for example. Accordingly, the existing IoT system can add support for the TLS extension, such as the maximum fragment length extension or the record size limit extension. However, some existing clients either do not implement the TLS extension and/or include a TLS library (such as mbed TLS) that does not implement the extension to specification. Thus, if support for the TLS extension is rolled out for the smart air conditioner, then the existing IoT devices that are incompatible with the extension would be unable to connect with the existing IoT system. Similarly, a second client would like to use the existing IoT system; however, due to security policies of the second client, the IoT devices of the second client may only use TLS versions of 1.2 or above. Thus, if the existing IoT system only supports TLS versions below 1.2 for certain messaging paths, then upgrading the existing IoT system may cause incompatibility issues with IoT devices of existing clients.

Generally described, aspects of the present disclosure are directed to systems and methods for dynamically configuring an IoT communications system to be compatible with a wide variety of IoT devices. The IoT communications system can receive a client message from the IoT device (such as a TLS client hello message). The client message can include an endpoint designation (such as by specifying an endpoint in the Server Name Indication (SNI) field of the TLS client hello message). In some embodiments, implementing the customization features described herein at a relatively low layer of the protocol stack, such as the cryptographic security protocol layer or lower, can allow the customization features to function regardless of the higher level protocols used by the IoT device, such as HTTP or MQTT. As described herein, the messages used to toggle the customization features can be at a sub-application communication layer. The IoT communications system can determine whether the endpoint is associated with a custom or default processing logic and/or settings. For example, the IoT communications system can determine that the client's endpoint has been configured for the maximum fragment length extension or the record size limit extension. Accordingly, either custom or default processing logic can be executed or custom or default settings can be applied. For example, if the client's endpoint implements the maximum fragment length extension or the record size limit extension, a gateway of the IoT communications system can send a server message that confirms and/or negotiates a custom fragment or record length with the IoT device. Conversely, if default processing logic is executed, then the gateway can communicate with the IoT device based on a default fragment or record size. Thus, the IoT communications system can communicate with a wide variety of IoT devices, such as by being backwards compatible with a wide variety of IoT devices.

As used herein, in addition to its ordinary and customary meaning, a "sub-application communication layer" can refer to a layer in a protocol stack and/or communication model, such as the Internet protocol suite, which can also be referred to as the TCP/IP stack. An example protocol stack can include an application layer, a transport layer, a network or Internet layer, and a link layer. In particular, a sub-application communication layer can refer to a layer that is below the application layer of the protocol stack and/or communication model. Example application layer protocols are HTTP and MQTT. Example sub-application communication layers include cryptographic security protocols (such as TLS or SSL), TCP, or IP. As described herein, using an indicator in a message at a sub-application communication layer (such as an endpoint designation in the Server Name Indication field of TLS) can advantageously allow customization at the server that is agnostic of the particular application layer protocol used (such as HTTP or MQTT).

Server Name Indication (SNI) is an extension of a cryptographic security protocol, such as TLS. Under the SNI extension, a client indicates which hostname it is attempting to connect to at the start of a handshake process. In a typical scenario, SNI allows a server to present multiple certificates on the same IP address and TCP port number and, therefore, allows multiple secure services over a security protocol to be served by the same IP address without requiring all those sites to use the same certificate.

The systems and methods described herein may improve compatibility between an IoT devices and an IoT communications system. As described herein, some existing IoT systems may lack the flexibility to support a wide variety of software protocols, extensions, and/or versions thereof. The customization features described herein can enable a system to communicate with a wide variety of software protocols, extensions, and/or versions thereof. Moreover, as mentioned above, implementing the customization features at a relatively low layer of the protocol stack, such as the cryptographic security protocol layer or lower, can allow the customization features to operate regardless of the higher level protocols used by the IoT device. Thus, the systems and methods described herein can advantageously improve over some existing systems by increasing network communication compatibility with IoT devices.

Turning to FIG. 1, an illustrative network environment 100 is shown in which an Internet of Things (IoT) communications system 105 enables interactions between IoT devices and services. The network environment 100 may include one or more IoT devices 102, one or more management devices 103, a network 104, an IoT communications system 105, and auxiliary services 106. The IoT communications 105 may include a management service 112, a gateway 114, a configuration service 116, a configuration data store 108, a rules engine 118, and one or more endpoints 120. The constituents of the network environment 100 may be in communication with each other either locally or over the network 104.

As used herein, an Internet of Things (IoT) device 102 may include any computing device capable of communicating with the IoT communications system 105 over the network 104, such as sensors, actuators, embedded devices, or smart appliances. Example computing devices include, but are not limited to, a smart mobile device, voice-enabled speakers, a smart refrigerator, a smart air conditioner, a smart fan, a smart watch, a smart fire alarm, a smart door lock, a smart bicycle, a medical sensor, a fitness tracker, and/or a smart security system. The IoT devices 102 may have vastly different hardware and/or software specifications, such as by including different cryptographic security protocols and/or versions. Moreover, it may be difficult to update the software on the IoT devices 102 because the devices may sit on a shelf for months or years even before being activated. Thus, unlike typical computers, smartphones, and/or applications on such devices (such as web browsers), IoT devices 102 may use cryptographic security protocols and/or versions that are several months or many versions behind current standards. The IoT devices 102 can communicate with the IoT communications system 105 using a variety of communications protocols, such as Hyper-Text Transfer Protocol (HTTP), an open source messaging protocol (such as MQTT), or a cryptographic security protocol (such as TLS or SSL).

Administrators can use the management devices 103 to configure the endpoints 120. The management devices 103 may include any computing device capable of communicating with the IoT communications system 105 over the network 104, such as a user computing device. Example user computing devices include a laptop or tablet computer, personal computer, personal digital assistant (PDA), hybrid PDA/mobile phone, mobile phone, and/or a smartphone. Administrators can configure the endpoints 120 using a graphical user interface, an Application Programming Interface (API), and/or a command line interface (CLI). For example, an administrator can specify to add or update an endpoint. The management service 112 can receive the request to add or update an endpoint, which can include an indication of which endpoints are configured for customized processing logic or settings, such as customized fragmentation or particular cryptographic security protocols and/or versions. The management service 112 can process configuration requests from the management devices 103, such as by updating the configuration data store 108.

As used herein, in addition to its ordinary and customary meaning, an "endpoint" can refer to a destination that an IoT device communicates with. Example endpoints can include a Uniform Resource Identifier (URI), a Uniform Resource Locator (URL), a host name, and/or a server name. As described herein, configuring an endpoint can refer to configuring the IoT communications system 105, such as the gateway 114, such that the IoT communications system 105 can support multiple configurations and/or customizations for various IoT devices. Thus, the IoT communications system 105 can support multiple cryptographic security protocols and/or versions and features thereof, which can include being backwards compatible with multiple versions of cryptographic security protocols.

As used herein, in addition to its ordinary and customary meaning, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, comma separated values (CSV) files, eXtendible markup language (XML) files, TeXT (TXT) files, flat files, spreadsheet files, and/or any other widely used or proprietary format for data storage.

The one or more IoT devices 102 can transmit messages to the IoT communications system 105. The gateway 114 can receive the messages. The gateway 114 can use information in the messages to determine whether customized or default processing logic and/or settings should be used to communicate with the IoT devices 102. The gateway 114 can receive configuration information from the configuration service 116, which can use data from the configuration data store 108. The rules engine 118 evaluates inbound messages and can transform and deliver the messages to another device or service, based on administrator defined rules. For example, the messages can include a request to an auxiliary service 106, which can include an on-demand code execution service. The auxiliary service 106 can interact with or process data from the IoT devices 102. For example, following authentication and/or authorization with the IoT communications system 105, the IoT device 102 can transmit input data (for example, sensor data, such as the current temperature from a smart air conditioner) to the system 105. A service 106 can execute code instructions that determines some output and the IoT communications system 105 transmits a message based on the output (for example, a command, such as a command for the smart air conditioner to turn on).

The network 104 may be any wired network, wireless network, or combination thereof. In addition, the network 104 may be a personal area network, local area network, wide area network, cable network, satellite network, cellular telephone network, or combination thereof. In addition, the network 104 may be an over-the-air broadcast network (e.g., for radio or television) or a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks, such as HTTP or MQTT. Protocols and components for communicating via the Internet or any of the other aforementioned types of communication networks are well known to those skilled in the art of computer communications and thus, need not be described in more detail herein.

Additionally, in some embodiments, the IoT communications system 105 components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "serverless," "cloud," or distributed computing environment.

Figure 2A:
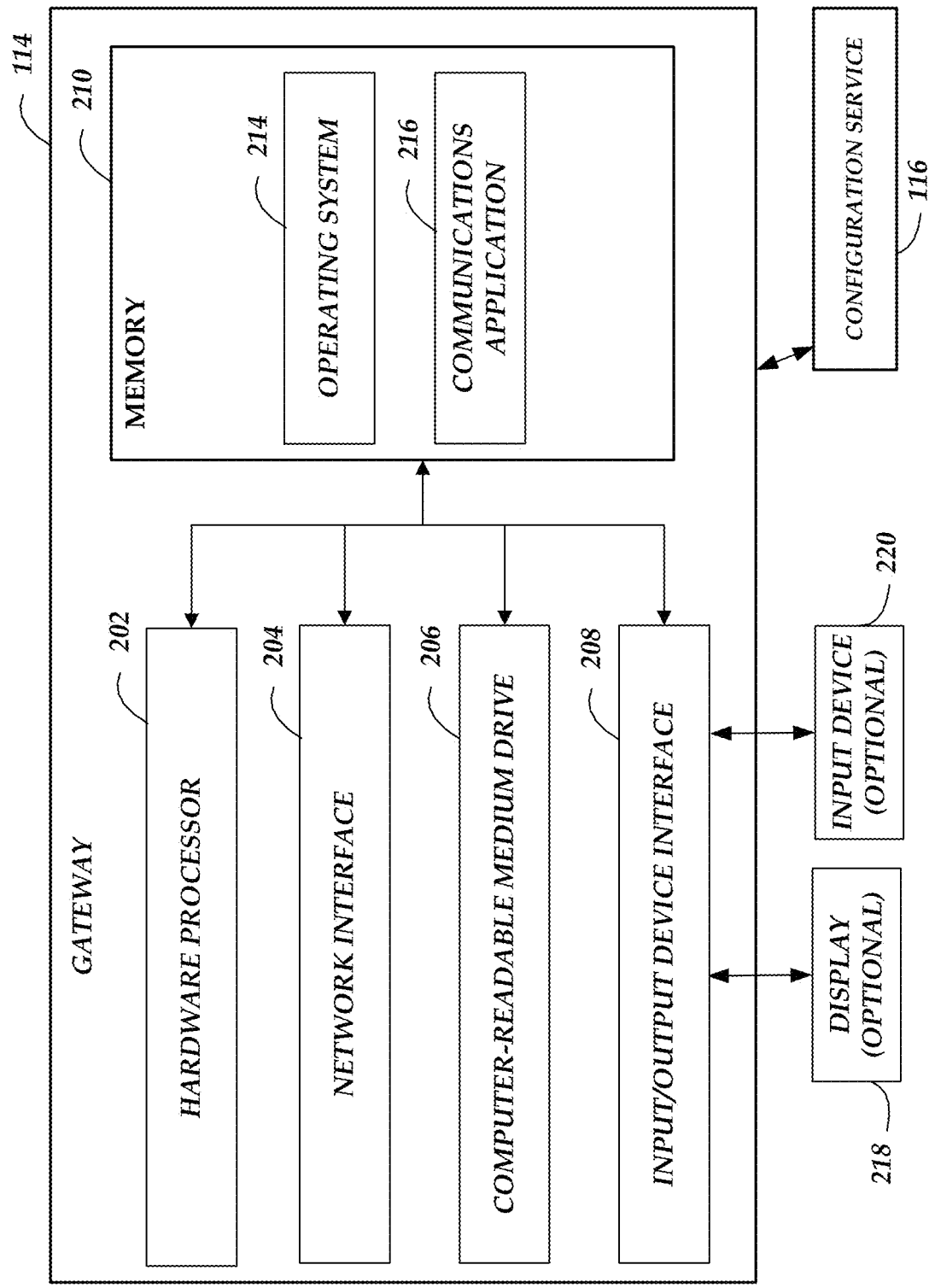
FIG. 2A depicts a general architecture of a gateway of the network environment depicted in FIG. 1.

FIG. 2A is a schematic diagram of an illustrative gateway 114 that can be used in the environment 100 in FIG. 1. The gateway 114 includes an arrangement of computer hardware and software components that may be used to process messages received from an IoT device 102. While the general architecture of the gateway 114 is shown and described with respect to FIG. 2A, the general architecture of FIG. 2A can be used to implement other services and/or applications described herein. Those skilled in the art will appreciate that the gateway 114 may include more (or fewer) components than those shown in FIG. 2A. Further, other computing systems described herein may include similar implementation arrangements of computer hardware and software components.

The gateway 114 may include a hardware processor 202, a network interface 204, a non-transitory computer-readable medium drive 206, and an input/output device interface 208, all of which may communicate with one another by way of a communication bus. As illustrated, the gateway 114 is associated with, or in communication with, an optional display 218 and an optional input device 220. In other embodiments, the display 218 and input device 220 may be included in the management devices 103 shown in FIG. 1. The network interface 204 may provide the gateway 114 with connectivity to one or more networks or computing systems. The hardware processor 202 may thus receive information and instructions from other computing systems (such as the IoT devices 102) or services via the network 104. The hardware processor 202 may also communicate to and from memory 210 and further provide output information for an optional display 218 via the input/output device interface 208. The input/output device interface 208 may accept input from the optional input device 220, such as a keyboard, mouse, digital pen, touch screen, accelerometer, gyroscope, or gestures recorded via motion capture and/or image recognition (e.g., eye, hand, head, and/or body part placement and/or recognition). The input/output device interface 220 may also output audio data to speakers or headphones (not shown). The gateway 114 can communicate with the configuration service 116, as described herein.

The memory 210 may contain specifically configured computer program instructions that the hardware processor 202 executes in order to implement one or more embodiments of the gateway 114. The memory 210 generally includes RAM, ROM and/or other persistent or non-transitory computer-readable storage media. The memory 210 may store an operating system 214 that provides computer program instructions for use by the processing unit 202 in the general administration and operation of the gateway 114. The memory 210 may further include other information for implementing aspects of the gateway 114.

The memory 210 may include a communications application 216 that may be executed by the hardware processor 202. In some embodiments, the communications application 216 may implement various aspects of the present disclosure. For example, the communications application 216 may process messages from IoT devices based on configuration information.

Figure 2B:
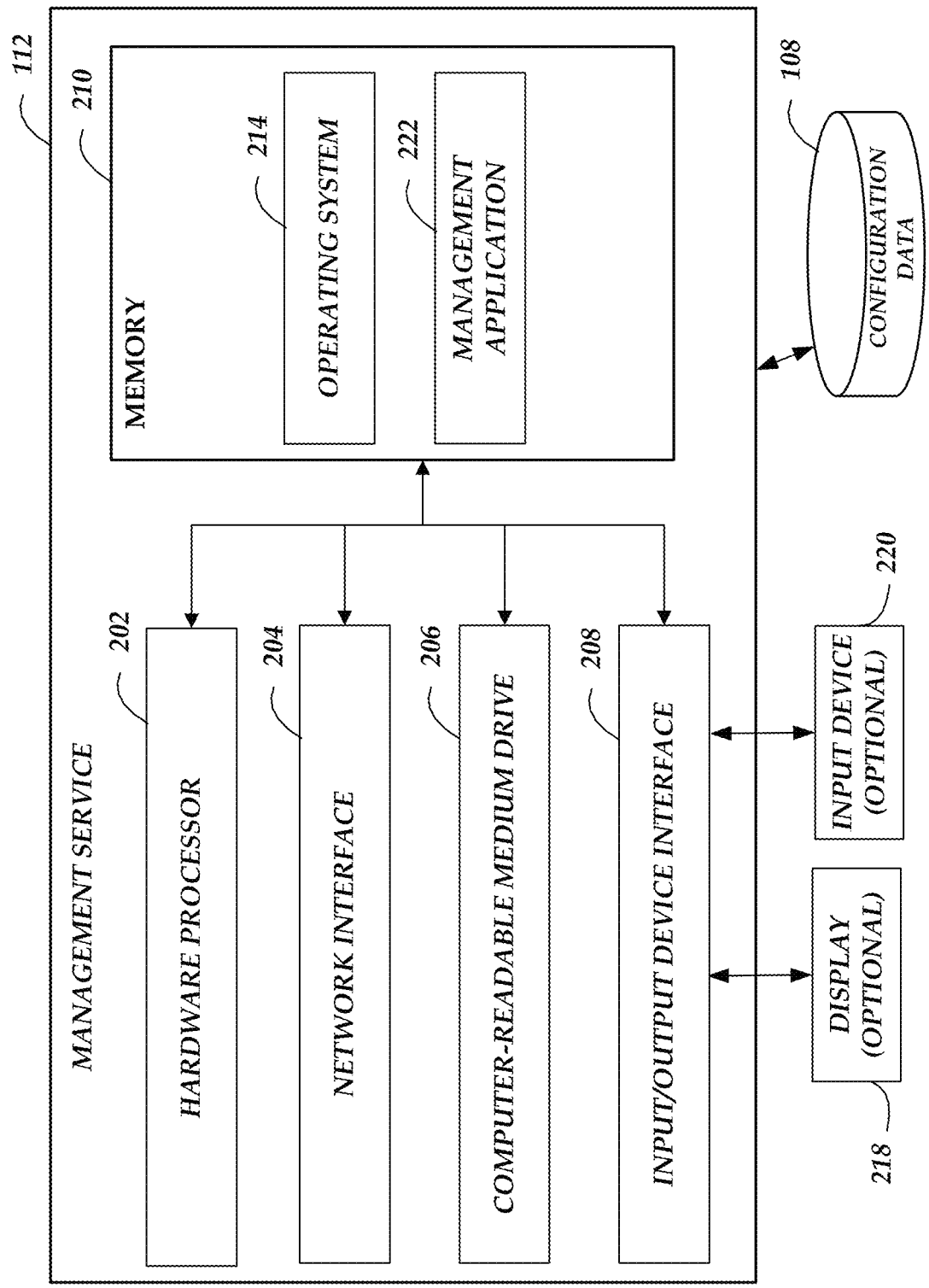
FIG. 2B depicts a general architecture of a computing device that is configured to implement a management service of the network environment depicted in FIG. 1.

FIG. 2B is a schematic diagram of an illustrative management service 112 that can be used in the environment 100 in FIG. 1. The management service 112 includes an arrangement of computer hardware and software components that may be used to configure the gateway 114 and/or the endpoints 120. Like the gateway 114, the management service 112 may include a hardware processor 202, a network interface 204, a non-transitory computer-readable medium drive 206, and an input/output device interface 208, all of which may communicate with one another by way of a communication bus. As illustrated, the management service 112 is associated with, or in communication with, an optional display 218 and an optional input device 220. Those skilled in the art will appreciate that the management service 112 may include more (or fewer) components than those shown in FIG. 2B. Further, other computing systems described herein may include similar implementation arrangements of computer hardware and software components.

The memory 210 may include a management application 222 that may be executed by the hardware processor 202. In some embodiments, the management 222 may implement various aspects of the present disclosure. For example, the management application 222 can retrieve or update configuration data in the configuration data store 108.

Figure 3:
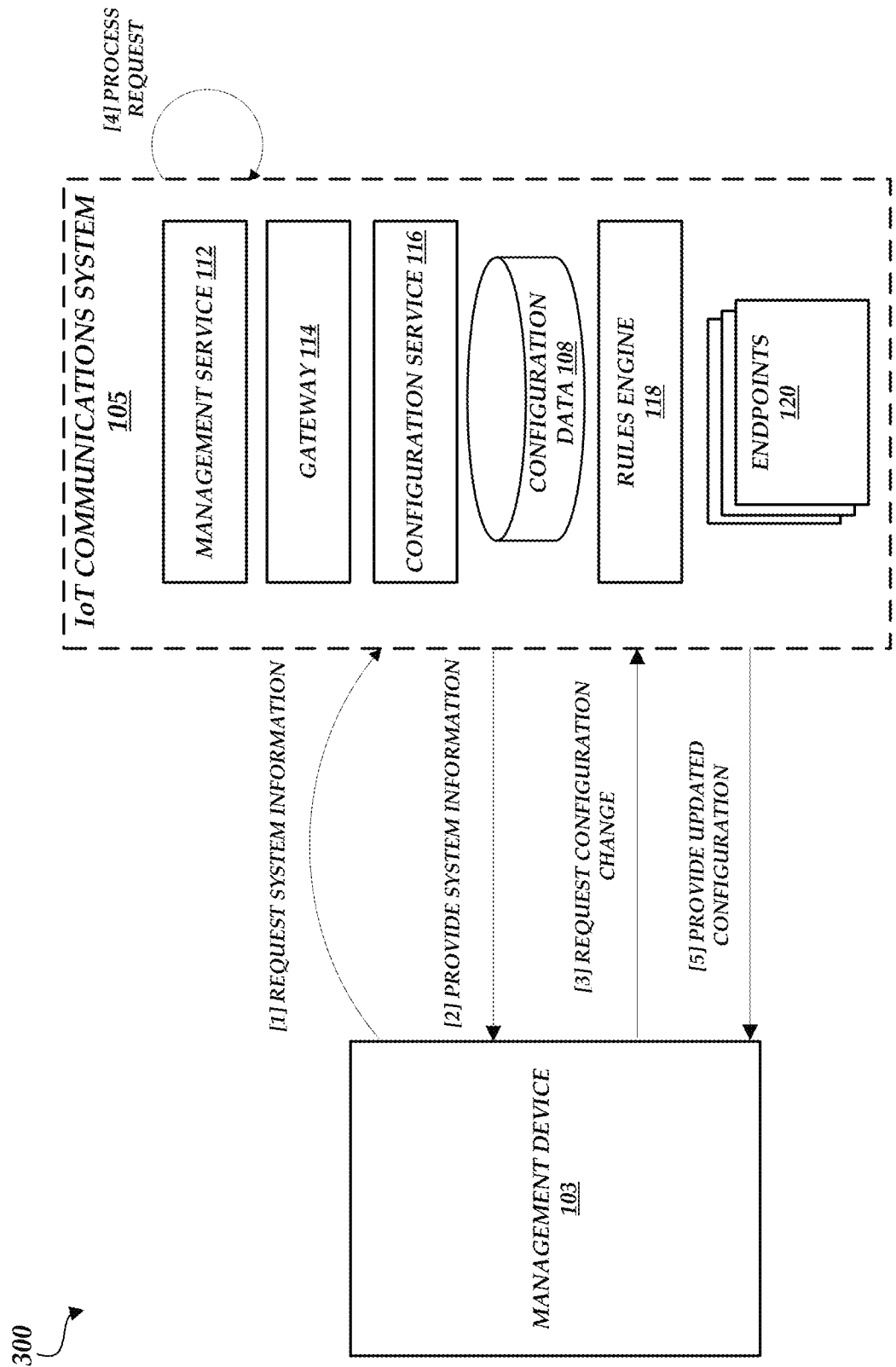
FIG. 3 is a flow diagram depicting illustrative interactions for configuring the IoT communications system.

With reference to FIG. 3, illustrative interactions are depicted for configuring the IoT communications system 105. The environment 300 of FIG. 3 can be similar to the environment 100 of FIG. 1. The depicted interactions in FIG. 3 are example interactions, some or all of which may be optional depending on the circumstances or embodiment. Other interactions (not illustrated) may be possible in accordance with the present disclosure in other embodiments. Similar to the communication depictions of FIG. 1, not every possible communication may be depicted in FIG. 3.

The interactions of FIG. 3 begin at step one (1) where a user can request, via the management device 103, information from the IoT communications system 105. The request can be request to receive metadata for one or more existing endpoints. Example metadata can be settings and/or configuration for the existing endpoint(s). Additional example metadata can be a listing of endpoints for a particular client. Metadata regarding the one or more endpoints 120 can be stored in the configuration data store 108. The management service 112 can receive the request for information.

At step two (2), the IoT communications system 105 can provide the requested information. The management service 112 can receive the information. For example, the management service 112 can query the configuration data store 108. The management service 112 can transmit the requested information to the management device 103. The information can indicate a current configuration and/or settings for the endpoint, which can be a default configuration and/or default settings. Example configurations can be the latest recommended security configuration for the endpoint(s).

At step three (3), a user can request, via the management device 103, a configuration change to the IoT communications system 105. The change request can be a request to create, update, or delete an endpoint. The change request can further include an indication that the endpoint should be associated with custom or default processing logic and/or settings. For example, a user can configure an endpoint to support a cryptographic security protocol extension, such as a maximum fragment length extension or a record size limit extension.

At step four (4), the IoT communications system 105 can process the change request. In particular, the management service 112 can process the change request. For example, the management service 112 can create, update, or delete an endpoint. In particular, the management service 112 can create, update, or delete metadata regarding the endpoint in the configuration data store 108. For example, a list of endpoints that are configured for the maximum fragment length extension or a record size limit extension can be stored in a data structure, such as a white list of endpoints.

At step five (5), the IoT communications system 105 can provide updated configuration information to the management device 103. The management service 112 can present the updated configuration information to a user. For example, a user can review any changes to the configuration and/or settings for endpoints.

Figure 4:
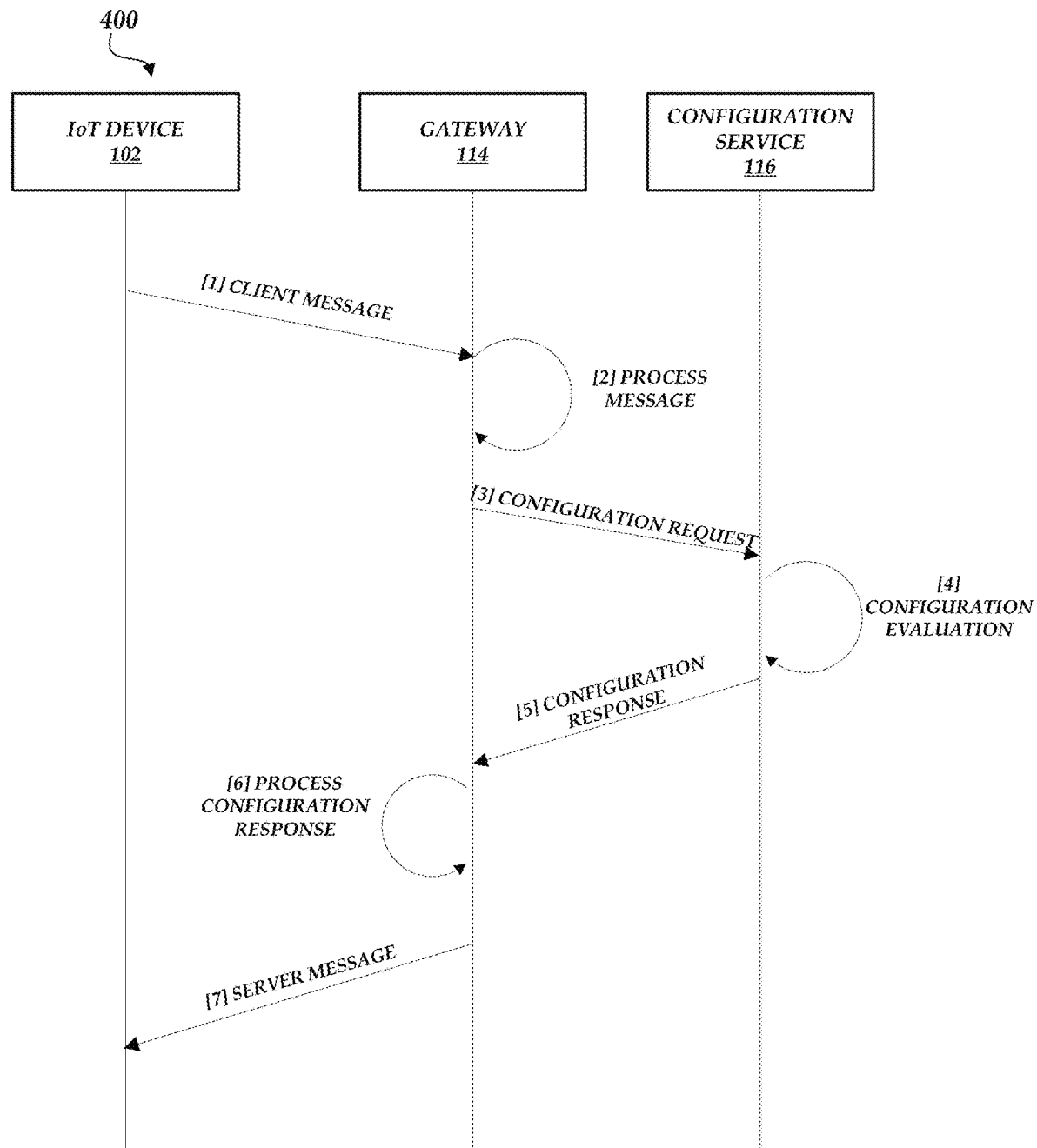
FIG. 4 is a flow diagram depicting illustrative interactions for communicating with the IoT communications system.

With reference to FIG. 4, illustrative interactions are depicted for communicating with components of the IoT communications system 105. The environment 400 of FIG. 4 can be similar to the environment 100 of FIG. 1. The depicted interactions in FIG. 4 are example interactions, some of which may be optional depending on the circumstances or embodiment. Other interactions (not illustrated) may be possible in accordance with the present disclosure in other embodiments. Similar to the communication depictions of FIG. 1, not every possible communication may be depicted in FIG. 4.

The interactions of FIG. 4 begin at step one (1) where an IoT device 102 transmits a client message to the gateway 114. The client message can include an indication of an endpoint. The client message can be a message at a sub-application communication layer. For example, the client message can be a message from a cryptographic security protocol (e.g., TLS), such as a client hello message. The client message can include information in a Server Name Indication (SNI) field of the client message, such as the endpoint indication, which can be a host or server name. As described herein, the SNI field is typically used to allow a server to present multiple certificates on the same IP address and TCP port number. In other embodiments that rely on a different communication protocol, such as TCP, another field can be used to indicate configuration-related information, such as an endpoint.

At step two (2), the gateway 114 can process the client message. For example, the gateway 114 can extract configuration-related information from the client message. In the SNI example, the gateway 114 can extract the endpoint name from the SNI field of the client message.

At step three (3), the gateway 114 can request configuration information from the configuration service 116. For example, the gateway 114 can request configuration information for an endpoint that was included in the client message. In some embodiments, the configuration service 116 can be embedded within the gateway 114. Additionally or alternatively, the gateway 114 can include a data structure of configuration information, such as a cache. Thus, the gateway 114 can quickly retrieve configuration information, which may be advantageous to not unduly delay response times to send messages under certain communication protocols, such as TLS or SSL.

At step four (4), the configuration service 116 can evaluate the configuration request. For example, the configuration service 116 can look up the endpoint in a data structure, such as a white list. The configuration data can indicate that the endpoint is configured in a particular manner, such as by implementing a particular cryptographic security protocol extension (such as the maximum fragment length extension or the record size limit extension), implementing a particular cryptographic security protocol version, implementing a particular authentication feature (such as a multi-level wildcard domain certificate feature), implementing a custom authorizer, and/or implementing a particular version of a security certificate.

At step five (5), the gateway 114 receives the configuration response from the configuration service 116. At step six (6), the gateway 114 processes the configuration response. Based on the particular configuration of the endpoint, the gateway 114 can apply custom or default processing logic and/or settings. The custom or default processing logic and/or settings can, for example, be related to implementing the particular cryptographic security protocol extension (such as the maximum fragment length extension or the record size limit extension), implementing the particular cryptographic security protocol version, implementing the particular authentication feature (such as a multi-level wildcard domain certificate feature), implementing the custom authorizer, and/or implementing the particular version of the security certificate. In the case of a configuration for the maximum fragment length extension or the record size limit extension, the gateway 114 can extract a custom fragmentation length from the client message. The gateway 114 can process the custom fragmentation length, such as by implementing the cryptographic security protocol. In particular, the gateway 114 can be configured for the fragmentation or record extensions to send subsequent messages that confirm the custom fragmentation or record length and/or limit the size of fragments or records to the custom fragmentation or record length.

At step seven (7), the gateway 114 transmits a server message to the IoT device 102. The server message can be based on the executed custom or default processing logic and/or settings. The server message can be a message at the sub-application communication layer. If the executed custom processing logic generated some data, the data can be included in the server message. For example, in the case of a configuration for the maximum fragment length extension or the record size limit extension, the server message can be a TLS or SSL server hello message that includes the agreed upon fragmentation or record size. The server message can also be a message after a handshake has been completed and that conforms to the agreed upon fragmentation or record size. The server message can also correspond to how to endpoint is configured such as by conforming to a particular cryptographic security protocol version, a particular authentication feature (such as a multi-level wildcard domain certificate feature), including an authorization response, and/or including a particular version of the security certificate.

Figure 5:
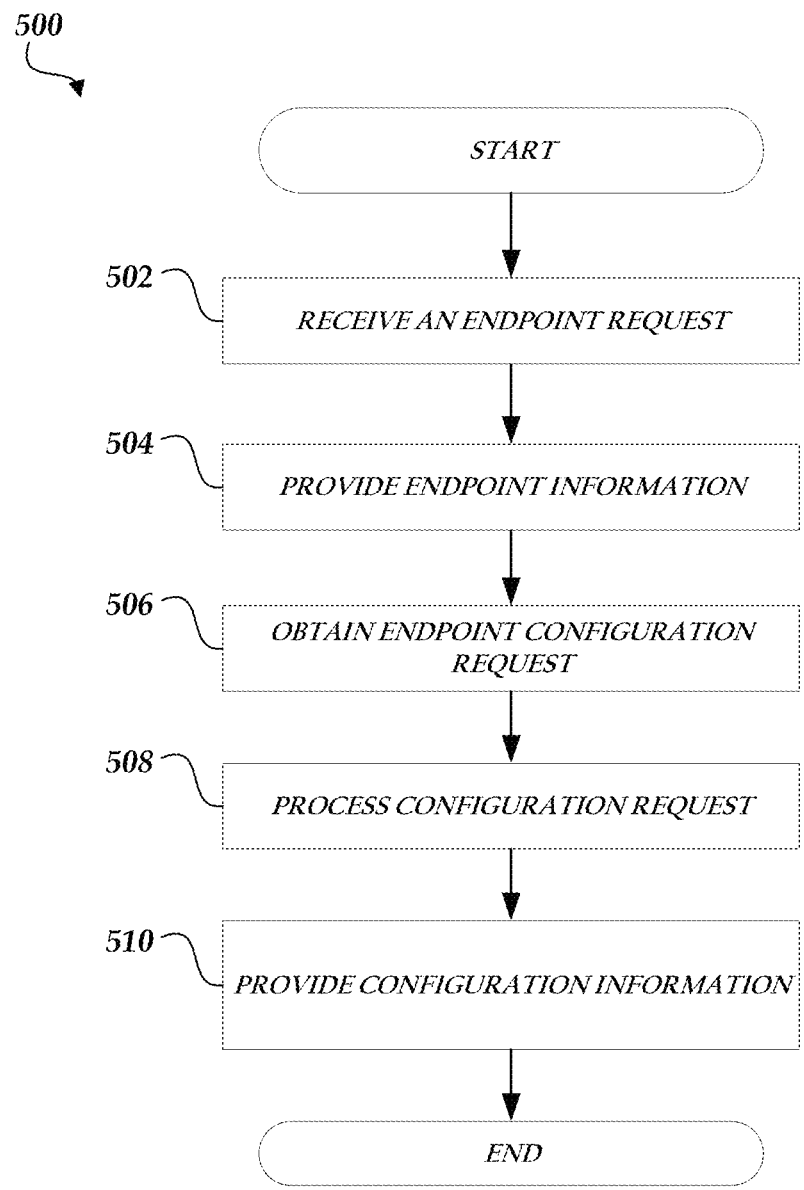
FIG. 5 is a flow chart depicting an example method for configuring the IoT communications system.

FIG. 5 is a flow diagram depicting an example method 500 implemented by the IoT communications system 105 for configuring endpoints and/or other aspects of the IoT communications system 105. As described herein, the IoT communications system 105 may include the management service 112. In some embodiments, the management service 112 may include the management application 222, and may implement aspects of the method 500. Moreover, some aspects of the method 500 may be described above with respect to FIG. 5.

Beginning at block 502, an endpoint request can be received. In particular, the management application 222 can receive an endpoint request from the management device 103. A user can request, via the management device 103, information regarding one or more endpoints, such as a request to receive metadata for one or more existing endpoints. As described herein, endpoint metadata can be settings and/or configuration for the existing endpoint(s) or a listing of endpoints for a particular client. Metadata regarding an endpoint can be stored in the configuration data store 108. The management service 112 can receive the request for information. The metadata regarding one or more endpoints can be stored in the configuration data store 108.

At block 504, endpoint information can be provided. In particular, the management application 222 can provide endpoint metadata to the management device 103. The management application 222 can query the configuration data store 108 for the metadata. The management application 222 can transmit the metadata to the management device 103. The metadata can indicate a current configuration and/or settings for the endpoint, which can be a default configuration and/or default settings. Example configurations can be the latest recommended security configuration for the endpoint(s). The management device 103 can present the endpoint metadata to a user in a user interface.

At block 506, an endpoint configuration request can be received. In particular, the management application 222 can receive an endpoint configuration request from the management device 103. For example, the endpoint configuration request can be a request to add, update, or delete an endpoint. The request can further indicate whether the endpoint should be associated with default or custom processing logic and/or settings. For example, among other customizations described herein, a user can configure an endpoint to support a cryptographic security protocol extension, such as extension, such as maximum fragment length extension or a record size limit extension.

At block 508, the configuration request can be processed. In particular, the management application 222 can process the change request. For example, the management service 112 can create, update, or delete an endpoint. The management application 222 can update a data structure in the configuration data store 108 to update or add the endpoint, such as by adding the endpoint to a white list. As described herein, a list of endpoints that are configured for the maximum fragment length extension or a record size limit extension can be stored in a data structure, such as a white list of endpoints. As described herein, the gateway 114 can cache some of the endpoint configurations. Accordingly, after an elapsed period of time (such as every five minutes), an updated data structure can be stored on the gateway 114.

At block 510, configuration information can be provided. In particular, the management application 222 can provide updated configuration information to the management device 103. For example, after creating, updating, or deleting an endpoint, the management application 222 can provide a confirmation of the action to the management device 103. The management service 112 can present the updated configuration information to a user. For example, a user can review any changes to the configuration and/or settings for endpoints.

Figure 6:
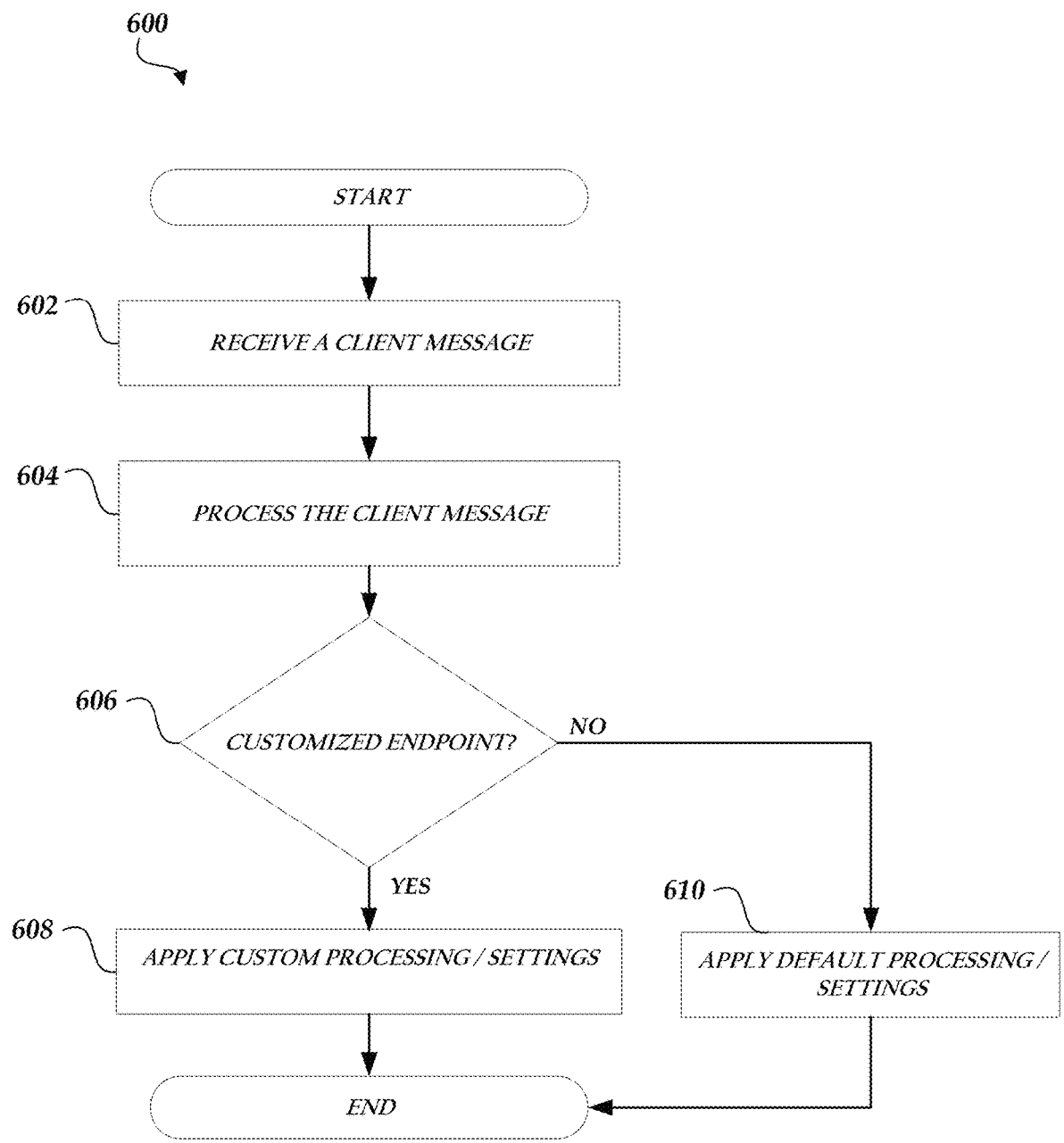
FIG. 6 is a flow chart depicting an example method of communicating with the IoT communications system.

FIG. 6 is a flow diagram depicting an example method 600 implemented by the IoT communications system 105 for communicating with IoT devices. As described herein, the IoT communications system 105 may include the gateway 114 and the configuration service 116. In some embodiments, the gateway 114 may include the communications application 216, and may implement aspects of the method 600. Moreover, some aspects of the method 600 may be described above with respect to FIG. 6.

Beginning at block 602, a client message can be received. For example, the gateway 114 and/or the communications application 216 can receive a client message from the IoT device 102. The client message can indicate an endpoint, such as by including an identifier for an endpoint. As described herein, the client message can be a message at a sub-application communication layer. The client message can include a cryptographic security protocol message, such as by being a TLS or SSL message. For example, the client message can be a TLS or SSL client hello message. As described herein, in some embodiments, client message can include information in a Server Name Indication (SNI) field of the client message. The SNI field can include a designation of an endpoint, such as a host or server name. As described herein, the SNI field is typically used to allow a server to present multiple certificates on the same IP address and TCP port number. However, the IoT communications system 105 can use the information in the SNI field to configure the behavior of the gateway 114, as described herein.

At block 604, the client message can be processed. In particular, the gateway 114 can process the client message. For example, the communications application 216 of the gateway 114 can extract data from the client message, such as field values from the message, which can include the endpoint designation.

At block 606, customization of the endpoint can be determined. In particular, the gateway 114 and/or the communications application 216 can determine whether the endpoint is customized, such as by being associated with custom processing logic and/or settings. For example, the communications application 216 can determine whether the endpoint is configured to support customized fragmentation. If the endpoint is customized, the method 600 can proceed to block 608 to process the client message based on customized settings (for example, the endpoint is configured to support customized fragmentation). Alternatively, if the endpoint is not customized, the method 600 can proceed to block 610 to process the client message based on default settings (for example, the endpoint is not configured to support customized fragmentation).

In some embodiments, the communications application 216 can communicate with the configuration service 116 to determine whether an endpoint is customized. The communications application 216 can query the configuration service 116. A response from the configuration service 116 can indicate that an endpoint is associated with custom processing logic and/or settings. In other embodiments, the configuration service 116 can push configuration data and/or updates to the gateway 114. The configuration service 116 can retrieve endpoint configurations from the configuration data store 108. For example, the communications application 216 and/or the configuration service 116 can determine that an endpoint is or is not configured to support customized fragmentation by consulting a white list. An example white list can be stored in the configuration data store 108. The example white list can include multiple endpoint designations that are configured for custom fragmentation or other customization settings. As described herein, the gateway 114 can store a local data structure that caches configuration data. The local data structure can be updated after an elapsed period of item.

At block 608, custom processing logic can be executed and/or custom settings can be applied. The gateway 114 and/or the communications application 216 can execute custom processing logic and/or apply custom settings. The execution of the custom processing logic can alter processing behavior (of the gateway 114 and/or the communications application 216) that is different than behavior of default processing logic. For example, execution of the custom processing logic and/or application of custom settings is more than simply relying on the SNI field to select a particular certificate. The execution of the custom processing logic can alter behavior of the gateway 114 and/or the communications application 216 in communication with the IoT device 102, for example, to select a particular cryptographic security protocol version, a particular authentication feature (such as a multi-level wildcard domain certificate feature), and/or use a custom authorizer. Execution of the custom processing logic can generate data, which can be included in the server response to the IoT device 102. The communications application 216 can transmit a server message to the IoT device 102 based at least in part on the execution of the custom processing logic. The server message can be a message at a sub-application communication layer. For example, the server message can be a TLS or SSL server hello message. The server message can be processed based on customized settings. In particular, the communications application 216 can process the client message based on customized settings.

Under the custom fragmentation example, the communications application 216 can extract a custom fragmentation length from the client message. The communications application 216 can further process the custom fragmentation length by negotiating a maximum fragmentation length with the IoT device 102. The communications application 216 can transmit a server message to the IoT device 102 based at least in part on the custom fragmentation length. As described herein, the server message can be a TLS or SSL server hello message. Continuing with the custom fragmentation example, if the communications application 216 accepts the custom fragmentation length, the communications application 216 can prepare and transmit a server message that accepts the proposed parameter, such as by including a custom fragmentation length in the server message that is the same value as the custom fragmentation length requested by the IoT device 102. Alternatively, if the communications application 216 rejects the custom fragmentation length, the communications application 216 can prepare and transmit a server message that rejects the proposed parameter, such as by indicating an illegal parameter alert. The IoT device 102 can subsequently negotiate a different fragmentation length.

In some embodiments, the custom processing logic can be associated with a particular version of a cryptographic security protocol. Thus, the communications application 216 can execute an instruction corresponding to the particular version of the cryptographic security protocol. For example, the particular version of a cryptographic security protocol can be TLS version 1.1, 1.2, or 1.3. The gateway 114 can thus trigger different code instructions or code paths based on the particular cryptographic security protocol version configuration for the endpoint.

In some embodiments, the custom processing logic can include an authentication feature. An example authentication feature can be one of several implementations of a multi-level wildcard domain certificate feature. For example, the IoT communications system 105 can be associated with custom-built multi-level wildcard domain certificate features or a multi-level wildcard domain certificate feature that is to specification. Depending on the client and endpoint, the corresponding IoT devices' authentication feature implementation can match up with how the endpoint and/or the gateway 114 has been configured. Thus, the gateway 114 can enable the particular multi-level wildcard domain certificate feature.

In some embodiments, the custom processing logic can be associated with a custom authorizer. Moreover, the communications application 216 can invoke the custom authorizer. The custom authorizer can be configured to authorize a request from the IoT device. An example custom authorizer can enable a client to author a custom authorization function that can be executed by an on-demand code execution system. The custom authorizer can receive a token as input. The custom authorizer can return an Identity and Access Management (IAM) policy as output. Thus, a client can configure endpoints in a custom manner with different authorizers.

In some embodiments, the custom processing logic can be associated with a particular version of a security certificate. Thus, the communications application 216 can generate response data that includes the particular version of the security certificate. For example, after a period of time, certain certificates may become deprecated, such as by being untrusted by some institutions or applications. However, a particular client may have a requirement or need to continue using an outdated certificate and may find the associated risk in using the certificate to be acceptable. Thus, the client can configure an endpoint to use outdated certificates, and some IoT devices can continue receiving particular certificates based on the configuration.

At block 610, default processing logic can be executed and/or default settings can be applied. The client message can be processed based on default settings. In particular, the gateway 114 and/or the communications application 216 can process the client based on default settings. For example, if the endpoint is not configured for a particular customization, such as customized fragmentation, the communications application 216 communicate with the IoT device based on default fragmentation. The communications application 216 can transmit a server message (such as a server message at the sub-application communication layer) to the IoT device 102 based at least in part on the execution of the default processing logic. As described herein, default processing logic and/or settings can be associated with a default cryptographic security protocol version, a default authentication feature (such as a multi-level wildcard domain certificate feature), a default authorizer, and/or a default version of a security certificate. Thus, some IoT devices can interact with the gateway 114 as if an extension, such as a fragmentation or record size extension, does not exist.

In the custom fragmentation example, the communications application 216 can transmit a server message to the IoT device 102 based at least in part on a default fragmentation length. For example, the communications application 216 can forgo attempting to extract a fragmentation length from the client message (which would be appropriate because the IoT device likely is using an older cryptographic security protocol that does not support custom fragmentation) and can transmit records to the IoT device 102 using a default fragmentation length. Moreover, the communications application 216 can omit including any data related to custom fragmentation since the endpoint is not configured for custom fragmentation.

It is to be understood that not all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer implemented method comprising:
   under control of a computer hardware processor configured with specific computer executable instructions,
      receiving, from a first Internet of Things (IoT) device, a first message at a sub-application communication layer of a protocol stack, the first message indicating a first endpoint, wherein the sub-application communication layer is below an application layer of the protocol stack, and wherein the first endpoint corresponds to a destination that communicates with the first IoT device via a gateway device different from the first endpoint;
      determining that the first endpoint is associated with custom processing logic;
      in response to determining that the first endpoint is associated with the custom processing logic, causing execution of the custom processing logic, wherein the execution of the custom processing logic alters processing behavior that is different than behavior of default processing logic; and
      transmitting, at the sub-application communication layer, a second message to the first IoT device based at least in part on the execution of the custom processing logic.

2. The computer implemented method of claim 1, wherein the first message comprises a Transport Layer Security (TLS) client hello message.

3. The computer implemented method of claim 2, wherein the first message indicates the first endpoint in a first Server Name Indication (SNI) field of the first message.

4. The computer implemented method of claim 1, wherein determining that the first endpoint is associated with the custom processing logic further comprises:
   determining that the first endpoint is configured to support customized fragmentation, and wherein applying the custom processing logic further comprises:
      extracting a custom fragmentation length from the first message; and
      processing the custom fragmentation length.

5. The computer implemented method of claim 1, further comprising:
   receiving, from a second IoT device, a third message at the sub-application communication layer, the third message indicating a second endpoint;
   determining that the second endpoint is associated with the default processing logic;
   in response to determining that the second endpoint is associated with the default processing logic, causing execution of the default processing logic; and
   transmitting, at the sub-application communication layer, a fourth message to the second IoT device based at least in part on the execution of the default processing logic.

6. The computer implemented method of claim 1, wherein determining that the first endpoint is associated with custom processing logic further comprises:
   identifying the first endpoint in a white list comprising a plurality of endpoints.

7. A system comprising:
   a data storage medium; and
   one or more computer hardware processors in communication with the data storage medium, wherein the one or more computer hardware processors are configured to execute computer-executable instructions to at least:
      receive, from an Internet of Things (IoT) device, a first message at a sub-application communication layer of a protocol stack, the first message indicating a first endpoint, wherein the sub-application communication layer is below an application layer of the protocol stack, and wherein the first endpoint corresponds to a destination that communicates with the IoT device via a gateway device different from the first endpoint;
      determine that the first endpoint is associated with custom processing logic;
      execute the custom processing logic that alters processing behavior that is different than behavior of default processing logic, wherein to execute the custom processing logic, the one or more computer hardware processors are configured to execute further computer-executable instructions to at least:
         generate first data; and
         transmit, at the sub-application communication layer, a second message to the IoT device, the second message comprising the first data.

8. The system of claim 7, wherein the first message comprises a cryptographic security protocol message.

9. The system of claim 7, wherein the custom processing logic is associated with a particular version of a cryptographic security protocol, and wherein to execute the custom processing logic, the one or more computer hardware processors are configured to execute further computer-executable instructions to at least:
execute an instruction corresponding to the particular version of the cryptographic security protocol.

10. The system of claim 7, wherein the custom processing logic comprises an authentication feature.

11. The system of claim 10, wherein the authentication feature is associated with a multi-level wildcard domain certificate feature, and wherein to execute the custom processing logic, the one or more computer hardware processors are configured to execute further computer-executable instructions to at least:
enable the multi-level wildcard domain certificate feature.

12. The system of claim 7, wherein the custom processing logic is associated with a custom authorizer, and wherein to execute the custom processing logic, the one or more computer hardware processors are configured to execute further computer-executable instructions to at least:
invoke the custom authorizer, wherein the custom authorizer is configured to authorize a request from the IoT device.

13. The system of claim 7, wherein the custom processing logic is associated with a particular version of a security certificate, and wherein to generate the first data, the one or more computer hardware processors are configured to execute further computer-executable instructions to at least:
incorporate the particular version of the security certificate into the first data.

14. A system comprising:
a data storage medium; and
one or more computer hardware processors in communication with the data storage medium, wherein the one or more computer hardware processors are configured to execute computer-executable instructions to at least:
receive, from an Internet of Things (IoT) device, a first message at a sub-application communication layer of a protocol stack, the first message indicating a first endpoint, wherein the sub-application communication layer is below an application layer of the protocol stack, and wherein the first endpoint corresponds to a destination that communicates with the IoT device via a gateway device different from the first endpoint;
determine that the first endpoint is associated with custom processing logic;
cause execution of the custom processing logic, wherein the execution of the custom processing logic alters processing behavior that is different than behavior of default processing logic; and
transmit, at the sub-application communication layer, a second message to the IoT device based at least in part on the execution of the custom processing logic.

15. The system of claim 14, wherein the data storage medium stores a data structure comprising a plurality of endpoints, and wherein to determine that the first endpoint is associated with custom processing logic, the one or more computer hardware processors are configured to execute further computer-executable instructions to at least:
identify the first endpoint in the data structure comprising the plurality of endpoints.

16. The system of claim 15, wherein the one or more computer hardware processors are configured to execute further computer-executable instructions to at least:
receive, from a management device, a request to add or update a second endpoint, the request indicating that the second endpoint should be associated with the custom processing logic; and
generate an updated data structure comprising the second endpoint.

17. The system of claim 16, wherein the request is further received via at least one of: a graphical user interface, a command line interface, or an Application Programming Interface.

18. The system of claim 16, wherein the one or more computer hardware processors are configured to execute further computer-executable instructions to at least:
after an elapsed period of time, store the updated data structure in the data storage medium.

19. The system of claim 14, wherein to determine that the first endpoint is associated with custom processing logic, the one or more computer hardware processors are configured to execute further computer-executable instructions to at least:
query a configuration service to determine a configuration of the first endpoint; and
receive, from the configuration service, a response that indicates that the first endpoint is associated with the custom processing logic.

20. The system of claim 14, wherein the custom processing logic is associated with a particular version of a communication protocol, and wherein to execute the custom processing logic, the one or more computer hardware processors are configured to execute further computer-executable instructions to at least:
execute an instruction corresponding to the particular version of the communication protocol.

* * * * *